United States Patent [19]

Gaul et al.

[11] Patent Number: 4,820,324
[45] Date of Patent: Apr. 11, 1989

[54] GLASS CORROSION RESISTANT COBALT-BASED ALLOY HAVING HIGH STRENGTH

[75] Inventors: David J. Gaul; Dennis L. McGarry, both of Granville, Ohio

[73] Assignee: Owens-Corning Fiberglas Corporation, Toledo, Ohio

[21] Appl. No.: 29,824

[22] Filed: May 18, 1987

[51] Int. Cl.$^4$ .............................................. C03B 37/04
[52] U.S. Cl. .............................................. 65/8; 65/15; 65/374.12; 420/436; 420/588
[58] Field of Search .................................. 420/436–440, 420/585, 586, 588; 148/425; 65/8, 15, 374.12

[56] References Cited

U.S. PATENT DOCUMENTS

| | | | |
|---|---|---|---|
| 3,366,478 | 1/1968 | Wheaton | 75/171 |
| 3,549,356 | 12/1970 | Sims et al. | 75/171 |
| 3,881,918 | 5/1975 | Costin et al. | 75/171 |
| 3,933,484 | 1/1976 | Costin | 75/171 |
| 3,980,473 | 9/1976 | Costin | 75/171 |
| 3,984,240 | 10/1976 | Costin | 75/171 |
| 4,353,742 | 10/1982 | Crook | 75/122 |
| 4,497,771 | 2/1985 | Spencer et al. | 420/440 |
| 4,618,474 | 10/1986 | Ohe et al. | 420/436 |

FOREIGN PATENT DOCUMENTS

| | | |
|---|---|---|
| 901647 | 8/1985 | Belgium . |
| 59-179752 | 10/1984 | Japan . |
| 60-33332 | 2/1985 | Japan . |
| 60-52545 | 3/1985 | Japan . |
| 60-59039 | 4/1985 | Japan . |
| 60-224731 | 11/1985 | Japan . |
| 60-224732 | 11/1985 | Japan . |
| 60-258445 | 12/1985 | Japan . |
| 60-262934 | 12/1985 | Japan . |
| 60-262935 | 12/1985 | Japan . |
| 61-545 | 1/1986 | Japan . |
| 61-546 | 1/1986 | Japan . |
| 61-547 | 1/1986 | Japan . |
| 61-548 | 1/1986 | Japan . |
| 61-549 | 1/1986 | Japan . |
| 61-12842 | 1/1986 | Japan . |

*Primary Examiner*—R. Dean
*Attorney, Agent, or Firm*—Patrick P. Pacella; Robert F. Rywalski

[57] ABSTRACT

An alloy suitable for use as a spinner in forming glass fibers is provided. The alloy has outstanding stress rupture-life and is highly resistant to the erosion and corrosion of molten glass. The alloy is a cobalt-based alloy and further includes the following in approximate percent by weight, Carbon 0.5 to 1.0; Silicon 0.01 to 0.15; Chromium 30 to 40; Nickel 5 to 15; Tungsten (Wolfram) 4 to 7; Yttrium 0.5 to 1.5; Tantalum 2 to 5; Boron 0.005 to 0.04; Zirconium 0.1 to 0.4. The alloy typically will include the following as impurities, the amounts indicated being in percent by weight unless otherwise set forth: Aluminum 0 to 0.2%; Titanium 0 to 0.2%; Manganese 0 to 0.01%; Iron 0 to 1%; Phosphorous 0 to 0.005%; Molybdenum 0 to 0.10%; Sulfur 0 to 0.005%; Bismuth 0 to 0.5 ppm; Lead 0 to 5.0 ppm; Selenium 0 to 5.0 ppm; Silver 0 to 50 ppm; Nitrogen ($N_2$) 0 to 150 ppm; Oxygen ($O_2$) 0 to 50 ppm.

19 Claims, 1 Drawing Sheet

GLASS CORROSION RESISTANT COBALT-BASED ALLOY HAVING HIGH STRENGTH

TECHNICAL FIELD

This invention relates to improved cobalt-based alloys and, more particularly, it relates to cobalt-based alloys suitable for use as a spinner in the formation of glass fibers. The invention also relates to articles formed by casting those alloys.

Briefly stated the alloys contemplated by this invention are cobalt-based alloys which are free of hafnium and contain property enhancing amounts of yttrium, tantalum, boron, and zirconium; these alloys are relatively high in chromium and low in silicon and also contain tungsten, nickel and carbon. Incidental impurities may also be present.

BACKGROUND ART

In certain industrial applications there is a need for alloys which possess high rupture strength, high corrosion resistance and high oxidation resistance at elevated temperatures. Among such applications is the glass or mineral fiber industry where filaments are produced by passing a molten mineral material, for example glass, through the foraminous walls of a chamber which adapted for rotation at high speeds (the chamber being known as a spinner). The filaments are emitted through the fiberizing orifices in the walls due to the centrifugal action of the rotating spinner. Such spinners are typically operated, at temperatures on the order of about 2050° F. and rotation speeds on the order of 2050 RPM. It is advantageous, from a production cost standpoint, for the rotation speed to be as high as possible so as to increase the rate at which filaments are emitted through the fiberizing orifices. However, high spinner rotational speeds result in a reduction in spinner life due to the limited strength and corrosion resistance of the alloys.

Additional cost savings can be realized by fiberizing low cost batch formulations, such as higher viscosity glasses than that normally used to produce fibers used for glass insulation (wool glass) but, prior art alloys have not had the necessary balance of properties, especially the necessary mechanical strength, to fiberize at the higher temperatures required when using such higher viscosity glasses. It will thus be apparent that the stress rupture properties of prior art alloys definitely need improvement.

Exemplary of the attempts made in this area are Belgium Brevet 901647 and Japanese Laid-Open Patent Application No. 60-52545 (Application No. 58-161560). Both of these patents disclose hafnium containing cobalt-based alloys which, optionally, may include yttrium. Similarly, reference may be had to U.S. Pat. No. 4,618,474. Japanese Laid-Open Application No. 61-12842 (Application No. 59-131621) discloses a cobalt-base alloy containing hafnium and yttrium. U.S. Pat. No. 3,549,356 discloses cobalt- based alloys which include hafnium and yttrium and are zirconium free. U.S. Pat. No. 4,353,742 generally discloses a host of alloys; representative of the constituents noted are iron, cobalt, nickel, chromium, tungsten, silicon, zirconium, boron and yttrium. U.S. Pat. No. 3,881,918 discloses a cobalt-based superalloy containing high amounts of silicon; it is free of tantalum and boron and contains yttrium. U.S. Pat. No. 3,980,473 discloses a cobalt-based alloy which is boron free and relatively high in silicon and zirconium, the alloy also including yttrium. U.S. Pat. No. 3,984,240 discloses a cobalt-based alloy containing yttrium; it is free of boron and zirconium and contains relatively high amounts of silicon. U.S. Pat. Nos. 3,933,484 and 4,497,771 disclose yttrium free, cobalt-based alloys suitable for use in manufacturing glass. U.S. Pat. No. 3,366,478 disclose cobalt-based alloys which can include carbon, chromium, nickel, tantalum and zirconium; optional materials listed include for example, tungsten, iron, niobium, titanium, hafnium, silicon and rare earth metals.

In reviewing the above noted foreign and domestic references it will be seen that the present invention, with its outstanding balance of properties, including good glass corrosion resistance, good high temperature oxidation resistance and outstanding stress rupture life is nowhere suggested in any of those patents or applications.

DISCLOSURE OF THE INVENTION

Thus, in accordance with the present invention there is provided an improved cobalt-based alloy having superior strength and good hot glass corrosion resistance and high temperature oxidation resistance. The alloys have low creep rates and can be easily machined. These alloys are advantageously manufactured by vacuum induction melting and vacuum investment casting to produce spinners of outstanding quality. The alloys are substantially free of hafnium and contain zirconium, boron and tantalum, and relatively large amounts of chromium and small amounts of silicon. All of the alloys contemplated therein likewise contain yttrium as well as tungsten, nickel and carbon.

Thus in accordance with one feature of this invention, there is provided a cobalt-based alloy which is substantially free of hafnium and which includes the following on a weight percent basis: chromium about 30% to about 40%; nickel about 5% to about 15%; tungsten about 4% to about 7%; tantalum about 2% to about 5%; zirconium about 0.1% to about 0.4%; silicon 0.01% to 0.15%; carbon about 0.5% to about 1%; boron about 0.005% to about 0.04%; yttrium about 0.5% to about 1.5% by weight and the balance cobalt. A highly desirable composition will be Cr about 35% to about 36%, Ni about 10.7% to about 11.3%, W about 5.5% to about 6.1%, Ta about 2.2 to about 2.8, zirconium about 0.17% to about 0.23%, Si about 0.01% to about 0.13%, C about 0.70% to about 0.78%, B about 0.008% to about 0.012%, Y about 0.6% to about 0.9% and the balance Co. As will be readily apparent, the alloy may include impurities. It will generally be preferred that, if any of the following impurities are present, they be limited to the percentages indicated, i.e. these impurities will desirably be limited to the maximum amounts indicated; aluminum, up to 0.2% by weight; titanium up to 0.2% by weight; manganese up to 0.01% by weight; iron up to 1.0% by weight; phosphorus up to about 0.005% by weight; molybdenum up to about 0.10% by weight; sulfur up to about 0.005% by weight. The following impurities will desirably be limited to the maximum amounts indicated: bismuth up to about 0.5 parts per million (ppm); lead up to about 5 PPM; selenium up to about 5 ppm; and silver up to about 50 PPM. Nitrogen ($N_2$) should generally be limited to an amount of about 150 parts per million and oxygen ($O_2$) to an amount of about 50 parts per million.

An outstanding alloy composition as contemplated by this invention consists essentially of the following elements in the amounts indicated expressed on a weight percent basis (unless otherwise noted): C about 0.74%; Si about 0.07%; Cr about 35.5%; Ni about 11.0%; W about 5.8%; Y about 0.7%; Ta about 2.5%; B about 0.01%; Zr about 0.2%; Al 0 to about 0.2%; Ti 0 to about 0.2%; Mn 0 to about 0.01%; Fe 0 to about 1.0%; P 0 to about 0.005%; Mo 0 to about 0.10%; S 0 to about 0.005%; Bi 0 to about 0.5 ppm; Pb 0 to about 5.0 ppm; Se, 0 to about 5.0 ppm; Ag 0 to about 50 ppm; $N_2$ 0 to about 150 ppm; $O_2$, 0 to about 50 ppm and the balance Co except for other incidental impurities, said composition being substantially free of hafnium.

BRIEF DESCRIPTION OF THE DRAWINGS

The features and advantages of the present invention will become more clearly appreciated from the following description taken in conjunction with the accompanying drawings in which.

Figure 1:
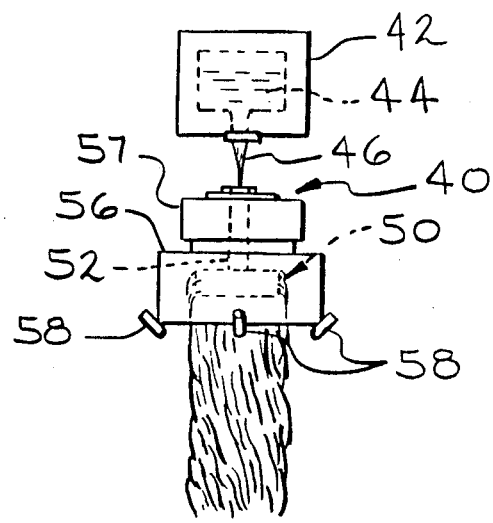
FIG. 1 is a semi-schematic, front elevational view of a rotary fiber forming system for producing glass fibers for insulation (wool) by employing a spinner.

DETAILED DESCRIPTION OF THE INVENTION, INCLUDING THE BEST MODE OF CARRYING IT OUT

Compositions of this invention can be prepared by vacuum induction melting and vacuum investment casting according to recognized procedures for cobalt alloys, sometimes known in the art as superalloys. In the preferred method of producing the alloys the original melt formed in the crucible will consist principally of chromium and cobalt. Thereafter the remainder of the elements required can be introduced into the original melt in any order when the melt temperature is within the range of from about 2700° to about 2800° F. As an alternate, however, all components of the composition can be introduced into the crucible with the cobalt and chromium. Inasmuch as zirconium and boron are contained in the composition in certain proportions, it is preferred that the zirconium, boron, and tantalum, be introduced into the melt shortly before pouring in order to prevent the oxidation of these materials and their loss from the crucible. Yttrium is added last to minimize oxidation and volatilization. After the addition of these latter materials, the melt is heated to a temperature within the range of from about 2800° F. to about 3025° F. to produce a uniform composition. The temperature of the melt is reduced to 2600° F. to 2750° F. and poured into a heated investment mold. The mold temperature is between 1600° F. and 1900° F. with 1800° F. being optimum. (The investment mold is produced by the lost wax process in which a wax pattern of the casting is invested in a series of ceramic slurries which are cured. The wax is removed in a steam autoclave and the finished mold is heated in a suitable high-temperature furnace.) As an alternative, the virgin materials are melted in a large vacuum furnace by one of the above methods. The resulting alloy is poured into bars of ingot approximately 3 to 4 inches in diameter. The ingot is then cut and charged into a small vacuum induction furnace, melted, and poured into an investment mold. Preferably, the resulting cast alloy is heat treated at 2000° F. for 3 hours and air cooled. This heat treatment will reduce the residual stresses in the casting. It is also possible to heat treat the cast alloy with a solution and age heat treatment by heating to approximately 2300° F. for 4 hours, air cooling, heating to 1700° F. for 16 hours and air cooling prior to further operations.

Castings made from the alloys of the present invention are produced by the vacuum investment casting process which allows the introduction of the reactive element, yttrium, and the introduction of higher levels of other reactive elements such as zirconium and tantalum than can be used with the prior art alloys of e.g. U.S. Pat. No. 3,933,484. The vacuum investment casting process is described in *The Superalloys* by Sims and Hagel, John Wiley and Sons, Inc., 1972, pages 383–391 and 403–425. Castings of the prior art alloys have been produced via an air-melt process requiring the presence of a high level of silicon in the alloys to increase the fluidity of the melt. Fluidity is not a problem with the vacuum investment cast process, and therefore the silicon content in the alloys of the present invention is kept at a low level. Furthermore, the use of high silicon content alloys in vacuum investment cast processes should be avoided as castings formed by this process are susceptible to a defect known as shrinkage porosity. The presence of high amounts of silicon in the alloys increases the freezing range of the alloys giving rise to casting integrity problems. One of the benefits of using the vacuum investment cast process is the ability to produce near net shape castings. The alloys of the present invention are ideal for vacuum investment cast processes compared with the prior art alloys containing a high silicon content.

Even if a good quality casting of a prior art alloy of e.g. U.S. Pat. No. 3,833,484 is made by the vacuum investment cast process, the casting will not possess the mechanical performance of the alloys of the present invention. For example, a casting of an alloy of U.S. Pat. No. 3,933,484 may have a rupture life of only 31 hours but, the same alloy composition when made by a vacuum melting and vacuum investment casting process, may have a rupture life of 93 hours. However, even though the rupture life is increased by the vacuum melting process, the creep rate is too high for dimensional stability. The creep rate may increase from $6.8 \times 10^{-4}$ in./in./hr. to $3.7 \times 10^{-3}$ in./in./hr. at 2100° F. and 3000 psi. Thus, the mechanical performance of such a prior art alloy, even when subjected to a vacuum melting and investment casting process, is not as good as the alloys of the present invention when also subjected to the vacuum melting and investment cast process.

As previously indicated the alloys of this invention are outstandingly adapted for use in the manufacture of spinners. These spinners then, in turn, because of their outstanding qualities, including high creep resistance and high stress rupture life, can be used to make glass fibers, especially in the overall process of making glass fiber insulation (wool).

Figure 2:
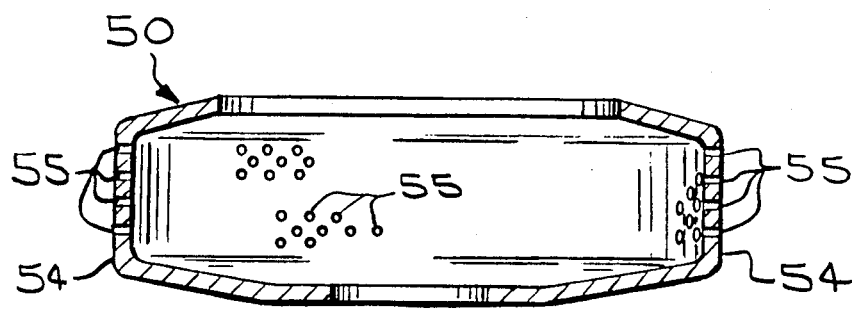
FIG. 2 is an enlarged cross-sectional view of a spinner of the type shown in FIG. 1.

Referring to FIGS. 1 and 2, in which like numerals represent like parts. There is shown a rotary or centrifugal glass fiber forming system including a rotor or spinner 50 fabricated in its entirety of the alloy of this invention. As shown in FIG. 1, rotary or centrifugal fiber forming system 40 is comprised of a flow means or channel 42 having a body of molten inorganic material 44, such as glass, therein. A stream of molten glass 46 is supplied to the rotor or spinner 50 from channel 42 in a manner well known in the art. Spinner 50 (shown in greater detail in FIG. 2), which is adapted to be rotated at high speeds is comprised of a quill 52 and a circumferential stream-defining or working wall 54 having a plurality of orifices or apertures 55 therethrough. These orifices supply a plurality of pre-filament or primary stream of molten and inorganic material such as glass to be fiberized. A shroud 56 and circumferential blower or fluid attenuation means 57 are adapted to assist in the attenuation of the streams of molten material into fibers or filaments 60. A binder material or coating may be applied to the fibers 60 by means of binder applicators 58 as is well known in the art. The thus formed fibers are then collected as a pack or mat to produce glass fiber insulation, commonly referred to as wool insulation.

The mechanical performance of the alloys of the present invention may be enhanced by subjecting these alloys to a heat treatment which solutions the cast carbide structure and then precipitates a high fraction of MC carbides and produces a fine dispersion of $M_{23}C_6$ carbides (an approximate composition of the carbide is $Cr_{21}W_2C_6$.) The MC carbides and the fine dispersion of $M_{23}C_6$ carbides substantially increases the rupture life of the alloys.

One cannot solution and age some of the prior art alloys such as, for example, those exemplified in U.S. Pat. No. 3,933,484 in view of the high silicon content which, as stated above, increases the freezing range. This in effect lowers the incipient melting point such that any temperature necessary to solution the carbides is above the incipient melting point. Silicon partitions to investment cast using conventional techniques and were heat treated like Alloy B.

The strength of the alloys were determined by a standard stress rupture test (American National Standards/ASTME 139-70-reapproved 1978). The relative corrosion rates of the alloys were determined by spinner coupon tests. In this test holes are countersunk into the top inside of a spinner face of the type described above. Samples or coupons composed of the alloys under investigation are press fit into the holes after which the spinner blanks are drilled. Thus the samples or coupons become an integral part of the spinner wall and a direct comparison can be made between various alloys in the form of such coupons because they are subjected to identical processing conditions.

In Table I a series of hafnium containing alloys are represented for a comparative reference. These alloys, it will be noted, are of ultra high purity because highly pure virgin melt stock was employed. The stress rupture life of the various samples was evaluated at 2100° F. at 4000 psi and it will be noted that these values range from 3.1 to about 36.8. No stress rupture life was obtained for sample A-1; this alloy could not be cast into stress rupture bars because the alloy was very brittle and the castings cracked on cooling. The compositions listed in Table I are target compositions based on calculations and taking into account, based on experience, possible losses which may occur during melting.

TABLE I

| Elements | Target Composition | | | | | | | | | | | | |
|---|---|---|---|---|---|---|---|---|---|---|---|---|---|
| | A-1 | A-2 | A-3 | A-4 | A-5 | A-6 | A-7 | A-8 | A-9 | A-10 | A-11 | A-12 | 3 |
| Cr | 39.0 | 32.5 | 36.5 | 32.5 | 36.5 | 32.5 | 36.5 | 32.5 | 36.5 | 32.5 | 36.5 | 32.5 | 32.5 |
| Ni | 6.0 | 8.0 | 8.0 | 8.0 | 8.0 | 8.0 | 8.0 | 8.0 | 8.0 | 8.0 | 8.0 | 8.0 | 8.0 |
| W | 1.0 | 6.8 | 6.8 | 6.8 | 6.8 | 6.8 | 6.8 | 6.8 | 6.8 | 6.8 | 6.8 | 6.8 | 6.8 |
| Mo | 6.0 | 0.0 | 0.0 | 0.0 | 0.0 | 0.0 | 0.0 | 0.0 | 0.0 | 0.0 | 0.0 | 0.0 | 4.0 |
| Ta | .8 | 0.0 | 0.0 | 0.0 | 3.5 | 3.5 | 2.5 | 2.5 | 0.0 | 0.0 | 0.0 | 0.0 | 2.5 |
| Zr | .01 | 0.0 | 0.0 | 0.0 | 0.0 | 0.0 | 0.0 | 0.0 | 0.4 | 0.4 | 0.01 | 0.01 | 0.01 |
| B | .01 | 0.0 | 0.0 | 0.0 | 0.0 | 0.0 | 0.0 | 0.0 | 0.01 | 0.01 | 0.01 | 0.01 | 0.01 |
| Si | 1.8 | .10 | .10 | .10 | .10 | .10 | .10 | .10 | 0.1 | 0.1 | 0.1 | 0.10 | 0.10 |
| Mn | 0.0 | 0.0 | 0.0 | 0.0 | 0.0 | 0.0 | 0.0 | 0.0 | 0.0 | 0.0 | 0.0 | 0.0 | 0.0 |
| C | .1 | .55 | .55 | .55 | .55 | .55 | .55 | 0.5 | 0.5 | 0.5 | 0.5 | 0.5 | 0.5 |
| Hf | .5 | .7 | .7 | .7 | .7 | .70 | 0.7 | 0.7 | 0.7 | 0.7 | 0.7 | 0.7 | 0.7 |
| Co | 44.0 | 51.4 | 47.4 | 51.4 | 43.9 | 47.9 | 44.9 | 48.9 | 46.9 | 50.9 | 47.3 | 51.3 | 44.8 |
| Fe | 0.0 | .1 | 0.0 | 0.0 | 0.0 | 0.0 | 0.0 | 0.0 | 0.0 | 0.0 | 0.0 | 0.0 | 0.0 |
| Cb(Nb) | 0.0 | 0.0 | 0.0 | 0.0 | 0.0 | 0.0 | 0.0 | 0.0 | 0.0 | 0.0 | 0.0 | 0.0 | 0.0 |
| Al | 0.0 | 0.0 | 0.0 | 0.0 | 0.0 | 0.0 | 0.0 | 0.0 | 0.0 | 0.0 | 0.0 | 0.0 | 0.0 |
| Ti | 0.0 | 0.0 | 0.0 | 0.0 | 0.0 | 0.0 | 0.0 | 0.0 | 0.0 | 0.0 | 0.0 | 0.0 | 0.0 |
| Stress Rupture Life 2100° F./4000 psi | * | 17.0 | 14.9 | 34.5 | 14.7 | 7.3 | 15.3 | 3.1 | 26.6 | 36.8 | 23 | 14.8 | 11.0 |

*Sample could not be cast the $M_{23}C_6$ carbides in such a fashion that it effects the composition and morphology. When high silicon content alloys are heat treated at solution temperature, the $M_{23}C_6$ carbides are rapidly ripened giving rise to a strength reduction. For example, if an alloy such as that exemplified by U.S. Pat. No. 3,933,484 is subjected to a solution heat treatment the rupture life of the alloy drops from 31 hours to 8 hours at 2100° F. in 3000 psi.

The following will demonstrate the outstanding properties of the present invention especially, the dramatic and unexpected improvement in stress rupture life, when compared to a variety of other compositions. In the alloys that follow, those designated B were all manufactured using an air-melting and air-casting technique and were heat treated at 2000° F. for three hours; that alloy generally exemplifies U.S. Pat. No. 3,933,484 and in the past has been an alloy of extensive commercial interest. The other alloys (unless indicated otherwise) were all vacuum induction melted and vacuum Another series of runs, and the results, are summarized in Tables II, III and IV. These compositions are hafnium and yttrium free. The sample designated B, as indicated above, exemplifies a composition falling within the range of U.S. Pat. No. 3,933,484 noted above. That alloy included additional incidental impurities but the impurities were not present in any amount which would materially effect the properties. Samples designated A and C similarly included impurities but again they were not of such magnitude as to effect the properties of the alloy.

With respect to the possible presence of impurities, compositions A and C contained less than about 0.005 weight percent sulfur, less than 0.005% by weight phosphorus, less than 0.20 weight percent aluminum, less than about 0.20 weight percent titanium and less than about 0.05 weight percent manganese, less than about 0.10 weight percent molybdenum and less than 1.0% by weight iron. Additionally, such samples could have included up to a maximum amount of 50 parts per million of nitrogen and 20 parts per million of oxygen.

TABLE II

|  | A | B | C |
|---|---|---|---|
| Cr | 32.5 | 31.2 | 36.5 |
| Ni | 8.0 | 11.7 | 8.0 |
| W | 6.8 | 7.4 | 6.8 |
| Ta | 3.5 | 1.8 | 3.5 |
| Zr | 0.4 | .025 | 0.4 |
| Si | 0.1 | 0.63 | 0.1 |
| C | 0.55 | 0.59 | .55 |
| B | 0.01 | .038 | .01 |
| Fe |  | 1.5 Max |  |
| Co | Balance | Balance | Balance |

TABLE III

| Alloy | Test Conditions Temp (°F.) | Stress (psi) | Average Life (Hours) | Average Creep Rate (in/in/hr) |
|---|---|---|---|---|
| C | 2100 | 3000 | 167 | $0.98 \times 10^{-4}$ |
| A | 2100 | 3000 | 163 | $1.1 \times 10^{-4}$ |
| B | 2100 | 3000 | 31 | $6.8 \times 10^{-4}$ |
| C | 2100 | 6000 | 2.8 |  |
| A | 2100 | 6000 | 8.9 |  |
| B | 2100 | 6000 | 2.1 |  |
| C | 2050 | 4000 | 201.6 | $2.15 \times 10^{-4}$ |
| A | 2050 | 4000 | 259.3 | $0.42 \times 10^{-4}$ |
| B | 2050 | 4000 | 36.5 | $1.1 \times 10^{-3}$ |
| B | 2100 | 1200 | 246.3 |  |
| C | 2050 | 5000 | 37 |  |
| B | 2050 | 5000 | 17.5 |  |
| C | 2200 | 2000 | 99.7 | $3.05 \times 10^{-4}$ |
| B | 2200 | 2000 | 11.5 |  |
| C | 2250 | 1000 | 174.1 | $1.2 \times 10^{-4}$ |
| B | 2250 | 1000 | 21.7 |  |
| A | 2050 | 5000 | 70.6 |  |

TABLE IV

| Alloy | Average Hot Glass Corrosion Rate (Mil/200 Hr) |
|---|---|
| A | 14.1 |
| B | 14.3 |
| A | 9.5 |
| B | 9.4 |
| A | 10.1 |
| B | 10.1 |
| C | 8.6 |
| B | 14.3 |
| C | 4.6 |
| B | 8.9 |
| C | 8.3 |
| B | 11.6 |
| C | 12.4 |
| B | 16.1 |

The following comparative examples also illustrate hafnium containing, yttrium free alloys and their properties. Table V shows the formulations and Tables VI and VII both show properties of those alloys as well as glass corrosion rate data for Alloy B. The compositions are not meant to indicate that impurities are precluded. In fact, there will inherently be some incidental impurities. In these examples both the D and E compositions would have had their impurity level limited to a maximum of about 0.005 weight percent sulfur, a maximum of about 0.005 weight percent phosphorus, a maximum of about 0.20 weight percent aluminum, a maximum of about 0.20 weight percent titanium, a maximum of about 0.05 weight percent manganese, a maximum of about 0.10 weight percent molybdenum, a maximum of 1.0 weight percent iron with maximum amounts of nitrogen and oxygen respectively being 50 parts per million and 20 parts per million.

TABLE V

| Element | D | E |
|---|---|---|
| Cr | 36.5 | 32.5 |
| Ni | 8.0 | 8.0 |
| W (Tungsten) | 6.8 | 6.8 |
| Ta | 3.5 | 3.5 |
| Zr | 0.40 | 0.40 |
| Si | 0.10 | 0.10 |
| C | 0.55 | 0.55 |
| B | 0.01 | 0.01 |
| Hf | 0.7 | 0.7 |
| Co | Balance | Balance |

TABLE VI

| Alloy | Average Stress Rupture Life (2100° F./3000 psi) | Average Creep Rate (in/in/hr) | Average Corrosion Rate (ml/200 hours) |
|---|---|---|---|
| D | 285.3 | $1.6 \times 10^{-4}$ | 7.1 |
| B | See Table III | See Table III | 14.3 |
| D | — | — | 7.1 |
| B | — | — | 9.8 |
| E | 130.4 | $1.7 \times 10^{-4}$ | 7.1 |
| B | See Table III | See Table III | 9.3 |

TABLE VII

| Temperature (°F.) | Stress (psi) | Alloy | Average Life (Hours) |
|---|---|---|---|
| 2050 | 5000 | E | 45.9 |
| 2050 | 4000 | E | 120.3 |
| 2100 | 1200 | E | 1424 |
| 2100 | 4000 | D | 85 |

The following exemplifies the present invention and is compared against hafnium bearing alloys which have indicated outstanding properties. The formulations given are not meant to exclude impurities. With Alloy F and Alloy G the impurities indicated below, which may have been present, would not have been in excess of the maximum amounts indicated: Al about 0.2% max; Ti about 0.2% max; Mn about 0.01% max; Fe about 1% max; P about 0.005% max; Mo about 0.10% max; $N_2$ about 150 ppm max; $O_2$ about 50 ppm max; S about 0.005% max; Bi about 0.5 ppm max; Pb about 5.0 ppm max; Se about 5.0 ppm max; Ag about 50 ppm max.

TABLE VIII

| Element | Alloy F | Alloy G | A-14 |
|---|---|---|---|
| C | 0.74 | 0.74 | 0.6 |
| Si | 0.07 | 0.07 | 0.3 |
| Cr | 35.5 | 35.5 | 35.9 |
| Ni | 11.0 | 11.0 | 9.7 |
| W | 5.8 | 5.8 | 6.1 |
| Hf | 0 | 0.7 | 0.4 |
| Y | 0.7 | 0 | 0 |
| Ta | 2.5 | 2.5 | 0 |
| B | 0.01 | 0.01 | 0 |
| Zr | 0.2 | 0.2 | 0.02 |
| Co | Balance | Balance | Balance |

Alloy G had a stress rupture life of about 274.4 hours at 2100° F. and 3000 psi with a creep rate of about $2.0 \times 10^{-4}$ (in/in/hr). At 2100° F. and 4000 psi the respective values for Alloy G were 75 hours and $1.5 \times 10^{-3}$ (in/in/hour). Alloy A-14 at 2100° F. and 3000 psi had a life of 162.8 hours and an average creep rate of $3.1 \times 10^{-4}$. In contrast, the alloy (F) of the present invention had a completely unexpected rupture life of 2,065.5 hours and a creep rate of only $2.1 \times 10^{-5}$ (2100° F. and 3000 psi). This value of rupture life is also dramatically superior to that indicated above for the other alloy compositions. Especially note, for example, the data at 2100° F. and 3000 psi for Alloy B; that alloy for some time was considered to be the commercial alloy of choice. At 2100° F. and 4000 psi the alloy of this invention (Alloy F) had a creep rate of about $0.95 \times 10^{-4}$ in/in/hour and the stress rupture life is greater than 450.3 hours (bars had not yet broken).

A glass corrosion test was run for Alloy F against Alloy B; the results for this test were a corrosion rate of 7.14 (mil/200 hours) for Alloy F and 13.14 (mil/200 hours) for Alloy B. A second run was then made for Alloys B, G and F. The respectively measured corrosion rates were 9.1, 7.48 and 7.42 (mil/16200 hours). Thus it will be seen that the corrosion rate is quite satisfactory for Alloy F, the present inventive alloy.

INDUSTRIAL APPLICABILITY

It will be apparent from the above that glass spinners are formed of the alloys of the present invention and these spinners are then employed in the manner described to produce glass fibers and, more specifically, are employed in a process to produce fibers which are then formed into a bat to form fibrous glass insulation. In the terms of the art these alloys are employed to make spinners which are then, in turn, used to make "wool" glass.

Having described our invention it will, of course, be apparent that modifications are possible which pursuant to the patent statutes and laws do not depart from the spirit and scope thereof.

We claim:

1. As a composition of matter a glass corrosion resistant, high strength alloy consisting essentially of the following elements in the approximate ranges indicated in percent by weight:

| Element | Range |
|---|---|
| Cr | 30 to 40% |
| Ni | 5 to 15% |
| W | 4 to 7% |
| Ta | 2 to 5% |
| Zr | 0.1 to 0.4% |
| Si | 0.01 to 0.15% |
| C | 0.5 to 1.0% |
| B | 0.005 to 0.04% |
| Y | 0.5 to 1.5% |
| Co | Balance | and wherein said alloy is free of Hf and wherein said alloy contains 0–1% by weight of iron.

2. The composition of claim 1 wherein the alloy may optionally include one or more of the following in the amounts indicated, said amounts being in percent by weight unless otherwise noted:

| Impurities | |
|---|---|
| Al | 0 to 0.2% |
| Ti | 0 to 0.2% |
| Mn | 0 to 0.01% |
| Fe | 0 to 1.0% |
| P | 0 to 0.005% |
| Mo | 0 to 0.10% |
| S | 0 to 0.005% |
| Bi | 0 to 0.5 ppm |
| Pb | 0 to 5.0 ppm |
| Se | 0 to 5.0 ppm |

| Impurities | |
|---|---|
| Ag | 0 to 50 ppm |
| $N_2$ | 0 to 150 ppm |
| $O_2$ | 0 to 50 ppm |

3. The composition of claim 1 wherein the composition optionally includes one or more of the following in percent by weight:

| Impurities | |
|---|---|
| Al | 0 to 0.2 |
| Ti | 0 to 0.2 |
| Mn | 0 to 0.01 |
| Fe | 0 to 1.0 |
| P | 0 to 0.005 |
| Mo | 0 to 0.10 |
| S | 0 to 0.005 |

4. The composition of claim 3 wherein said composition optionally includes one or more of the following in the amounts indicated:
Bi 0 to 0.5 ppm
Pb 0 to 5.0 ppm
Se 0 to 5.0 ppm
Ag 0 to 50 ppm.

5. The composition of claim 4 wherein said composition optionally includes one or more of the following:
$N_2$ 0 to 150 ppm
$O_2$ 0 to 50 ppm.

6. The alloy composition of claim 1 wherein said alloy consists essentially of the following in approximate weight percent
Cr about 35% to about 36%
Ni about 10.7% to about 11.3%
W about 5.5% to about 6.1%
Ta about 2.2% to about 2.8%
Zr about 0.17% to about 0.23%
Si about 0.01% to about 0.13%
C about 0.70% to about 0.78%
B about 0.008% to about 0.012%
Y about 0.6% to about 0.9%
Co balance.

7. An article of manufacture produced by casting the composition of claim 1.

8. An article of manufacture produced by casting the composition of claim 2.

9. An article of manufacture produced by casting the composition of claim 6.

10. The article of claim 8 wherein said article has a side wall provided with a plurality of apertures.

11. An article having a side wall with a plurality of apertures, said side wall being formed of the alloy of claim 1.

12. The article of claim 7 wherein said article is a spinner for forming glass fibers from molten glass.

13. The article of claim 9 wherein said article is a spinner for forming glass fibers from molten glass.

14. In a method of making mineral or glass fibers comprising passing molten material through a foraminous wall of a metal alloy spinner to form such fibers, the improvement wherein the spinner comprises a high strength alloy, said alloy being of the composition of claim 1.

15. In a method of making mineral or glass fibers comprising passing molten material through a foraminous wall of a metal alloy spinner to form such fibers, the improvement wherein the spinner comprises a high strength alloy, said alloy being of the composition of claim 2.

16. In a method of making mineral or glass fibers comprising passing molten material through a foraminous wall of a metal alloy spinner to form such fibers, the improvement wherein the spinner comprises a high strength alloy, said alloy being of the composition of claim 6.

17. In a method of making mineral or glass fibers comprising passing molten material through a foraminous wall of a metal alloy spinner to form such fibers, the improvement wherein the spinner comprises a high strength alloy, said alloy being of the composition of claim 16.

18. In a method of making mineral or glass fibers comprising passing molten material through a foraminous wall of a metal alloy spinner to form such fibers, the improvement wherein the spinner comprises a high strength alloy, said alloy being of the composition of claim 5.

19. As a composition of matter the glass corrosion resistant, high strength alloy consisting essentially of the following elements in the amounts indicated, expressed in weight percent (unless otherwise noted):

C about 0.74%
Si about 0.07%
Cr about 35.5%
Ni about 11.0%
W about 5.8%
Y about 0.7%
Ta about 2.5%
B about 0.01%
Zr about 0.2%
Al about 0 to 0.2%
Ti about 0 to 0.2%
Mn about 0 to 0.01%
Fe about 0 to 1.0%
P about 0 to 0.005%
Mo about 0 to 0.10%
S about 0 to 0.005%
Bi about 0 to 0.5 ppm
Pb about 0 to 5.0 ppm
Se about 0 to 5.0 ppm
Ag about 0 to 50 ppm
$N_2$ about 0 to 150 ppm
$O_2$ about 0 to 50 ppm
Co Balance said composition being free of Hf.

* * * * *